INVENTORS
GINO J. MANGIALARDI, JR.
ANSELM C. GRIFFIN, JR.
VERNON P. MOORE

BY R. Hoffman

ATTORNEY

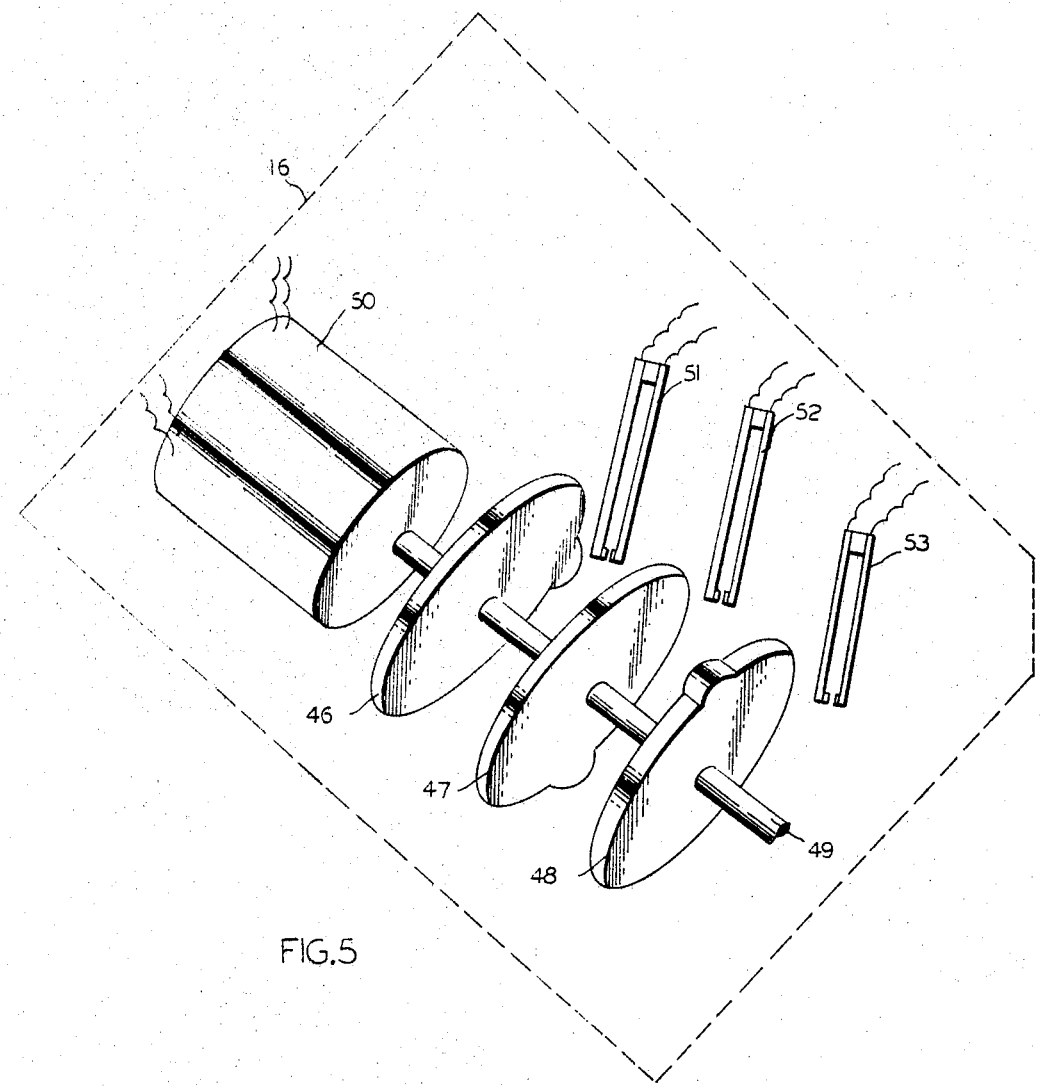

United States Patent Office 3,392,424
Patented July 16, 1968

3,392,424
COTTON GINNING SYSTEM HAVING AUTOMATIC SEED COTTON CONDITIONER
Gino J. Mangialardi, Jr., Greenville, and Anselm C. Griffin, Jr., and Vernon P. Moore, Leland, Miss., assignors to the United States of America as represented by the Secretary of Agriculture
Filed June 10, 1966, Ser. No. 556,704
3 Claims. (Cl. 19—66)

ABSTRACT OF THE DISCLOSURE

An apparatus for automatically removing moisture from or adding moisture to seed cotton to provide an optimum moisture content during the cleaning and ginning operations comprises a burner to heat incoming ambient air; a humidifier for adding water to the heated air; a conditioning chamber in which moisture is either added to or removed from incoming seed cotton; means for controlling the residence time of the seed cotton in the conditioning chamber; and appropriate ducts provided with automatically controlled valves to select either dry or moist air to be blown through the conditioning chamber. A moisture sensing device, located in the outlet of the master feed controller just prior to the feed inlet of the conditioning apparatus, transmits an appropriate electrical signal to conditioner controller which regulates both the moisture content of the air blown through the conditioning apparatus and the speed at which the seed cotton travels through the conditioning apparatus. The conditioning system is instantly and automatically convertible from moisture removal to moisture restoration, and vice versa, and the duration of exposure of the seed cotton to conditioning air is controlled regardless of whether the system functions as a drier or moisture restorer.

A non-exclusive, irrevocable, royalty-free license in the invention herein described, throughout the world for all purposes of the United States Government, with the power to grant sublicenses for such purposes, is hereby granted to the Government of the United States of America.

This invention relates to a seed cotton conditioner adapted for use in a cotton ginning system. More particularly, it relates to apparatus for automatically removing moisture from or adding moisture to seed cotton to provide an optimum moisture content during the cleaning and ginning operations.

As used herein, the term "seed cotton" refers to the usual designation in this art of the seed-containing cotton fibers prior to the separation of the two by the gin. Thus, the term may refer to the raw cotton as harvested and first delivered to the ginning plant, or it may refer to the seed-containing cotton from which trash and other extraneous materials have been removed in the preliminary cleaning operations prior to actual ginning.

In a typical commercial cotton ginning plant seed cotton brought to the plant is unloaded from the wagon by high-velocity, high-volume, air suction to a bulk feeder. The bulk feeder meters the seed cotton to a drying-cleaning system. Following this system, the seed cotton is delivered to the extractor-feeder for further cleaning and then passed to the gin stands for seed and fiber separation. Seeds are collected and fibers proceed to one or more stages of lint cleaning before baling.

A master feed-controller regulates the flow of seed cotton to the system at a rate considered ideal for that particular plant, taking into account both production rate and possible damage to cotton. Seed cotton leaving the master feed controller enters a high-volume, heated-air stream that carries it to a drying chamber. This chamber may have various shapes or sizes but usually is a stepped tower drier. The air stream leaving the tower drier is usually piped to a seed cotton cleaner which exhausts the warm moisture laden air to the outside. Large volumes of air are required because the drying air serves not only as the drying medium, but it must also transport the seed cotton from the master feed controller to the drier, through the drier, and on to a separator or "in air" cleaner from whence the heated air is exhausted to the outside.

It has been estimated that material handling by air in a gin plant comprises about 50 percent of the total power consumed by a gin plant. A large percentage of this material handling power is consumed by fans transporting seed cotton through the drying system.

In this type of drying system the drying process is considered to begin where the seed cottond first enters the heated air stream and ends at the seed cotton cleaner where the heated air is exhausted. In such a system a natural temperature gradient exists across the system with the highest temperature being at the seed cotton-heated air mixpoint and the lowest temperature being at the seed cotton-heated air separation or exhaust point. The temperature drop from mixpoint at master feed controller to exhaust at seed cotton cleaner will depend upon length of drier system, rate of air flow, initial hot air temperature, ambient temperature, cotton moisture content, and other factors. Temperature drops of over 150° F. are common.

Because of the temperature gradient across the drying system, variation in system length from one gin plant to another, and nonconstant ambient conditions, it is difficult to make blanket recommendations concerning drying temperatures, exposure periods and air volumes that could be considered ideal or even applicable to all ginning situations.

The United States Department of Agriculture Cotton Ginning Research Laboratories have found that seed and fiber separation at the gin stand with a fiber moisture content of about 7 percent satisfactorily maintains the inherent properties of the cotton. Ginners employing conventional drying systems and being unaware of proper settings for drying systems often overdry the cotton causing much fiber damage by separating seed from fiber at too low moisture levels.

In certain arid areas seed cotton is delivered to the gin plant at a fiber moisture content well below 7 percent. In addition to fiber damage resulting from ginning at low moisture levels, difficulties in moving cotton through the system are frequently encountered because of generation of static electricity. In these areas drying is not required and increasing the moisture content of the fiber would be beneficial both to fiber quality preservation and to smoother plant operation.

Some efforts at restoring moisture to dry seed cotton have been made in recent years. Both vapor and liquid phase restoration units are commercially available. A liquid phase unit cannot be used as a drier, while in at least one of the vapor phase units, an absorption chamber located too late in the ginning system to be of much value as a drier. Another available vapor phase unit is designed to work into and with the high air volume conventional conveyor-drier. It may also be used as a source of heat for drying only. This unit contains a cotton moisture sensing device to automatically convert its function from drying to vapor generation.

However, the sensing device is located at the gin stand, which means that the cotton has already passed through the conditioning system before its moisture content is measured.

Fiber quality studies have shown that the principal factor in maintaining the inherent fiber properties during the ginning processes is the fiber moisture content during seed fiber preparation. Fiber moisture content of about 7 percent has been found to be generally satisfactory.

Accordingly, one object of the present invention is to provide a system capable of delivering seed cotton to the gin stands at a moisture level of about 7 percent. Another object of this invention is to provide a system wherein the moisture content of the seed cotton is adjusted prior to the time at which processing commences. Another object is to provide a conditioning system which is instantly and automatically convertible from moisture removal to moisture restoration, and vice versa. A further object is to provide a system wherein the duration of exposure of the seed cotton to conditioning air is controlled regardless of whether the system functions as a dried or moisture restorer. Still another object is to provide a system wherein the conditioning air is not used to transport the seed cotton through the system, thus requiring relatively low volumes of air. A further object is to provide a novel conditioning chamber wherein the residence time of the seed cotton and the nature of the treatment can be automatically controlled. Other objects will become apparent to those skilled in the art from the description of the invention which follows.

In general, the present invention comprises interposing a conditioning apparatus between the master feed controller and the first seed cotton cleaning unit. A moisture sensing device, located in the outlet of the master feed controller just prior to the feed inlet of the conditioning apparatus, transmits an appropriate electrical signal to conditioner controller which regulates both the moisture content of the air blown through the conditioning apparatus and the speed at which the seed cotton travels through the conditioning apparatus. Essentially, the conditioning apparatus comprises a burner to heat incoming ambient air; a humidifier for adding water to the heated air; a conditioning chamber in which moisture is either added to or removed from incoming seed cotton; means for controlling the residence time of the seed cotton in the conditioning chamber; and appropriate ducts provided with automatically controlled valves to select either dry or moist air to be blown through the conditioning chamber.

In order that the invention may be readily understood, reference is made to the following detailed description and to the accompanying drawings in which:

FIGURE 5 shows one form of controller construction for operating the several moisture-regulating components of the system.

Figure 1:
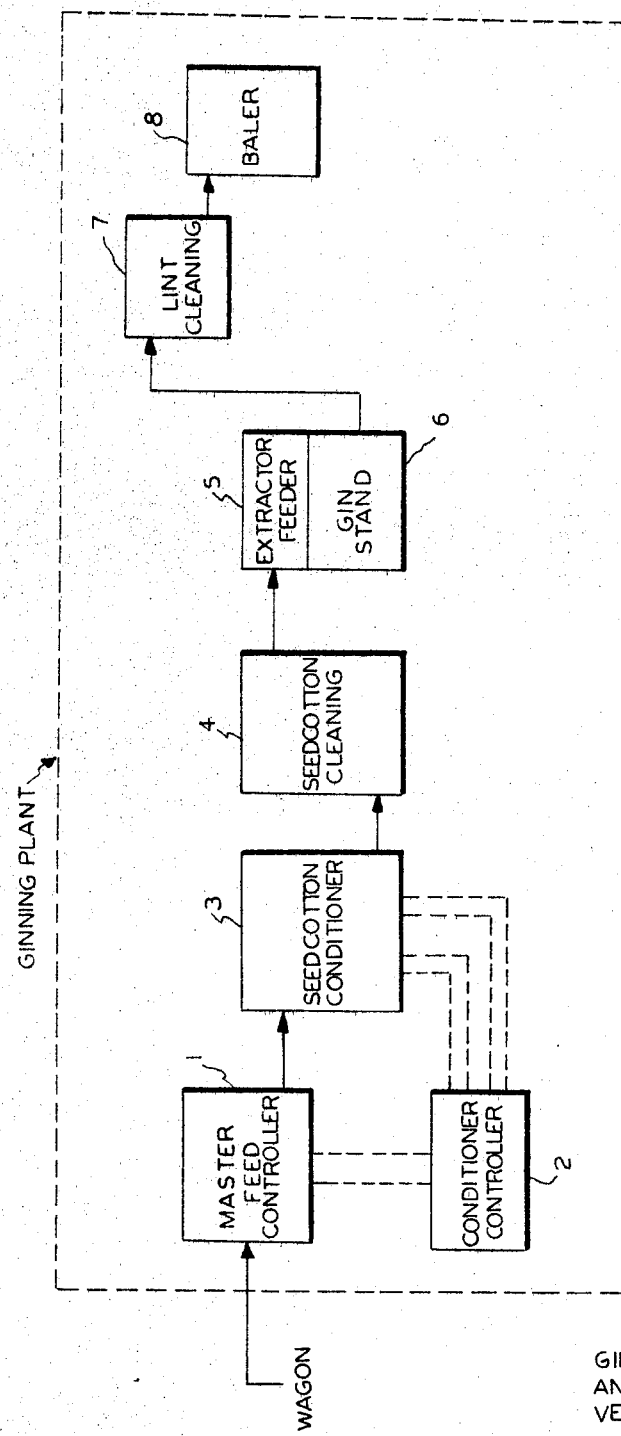
FIGURE 1 is a flow diagram showing the successive steps in the travel of the seed cotton through the system.

As seen from FIGURE 1, seed cotton is delivered to the ginning plant and enters the system at the master feed controller 1, whose function has already been described with reference to a typical commercial ginning plant. The moisture content of the cotton is measured by conditioner controller 2 which controls the seed cotton conditioner 3, bringing the seed cotton passing through the conditioner to a pre-selected moisture level by either decreasing or increasing the moisture content of the cotton, as required.

Following moisture conditioning, the seed cotton enters seed cotton cleaners 4, and extractor feeders 5, in preparation for fiber-seed separation at the gin stands 6. After fiber-seed separation, the ginned lint enters lint cleaners 7, and is finally baled at the baler 8.

Although FIGURE 1 shows all seed cotton conditioning before seed cotton cleaning, it will be apparent to those skilled in the art that one or more conditioners may be employed anywhere in the system between the master feed controller and the baler.

Figure 2:
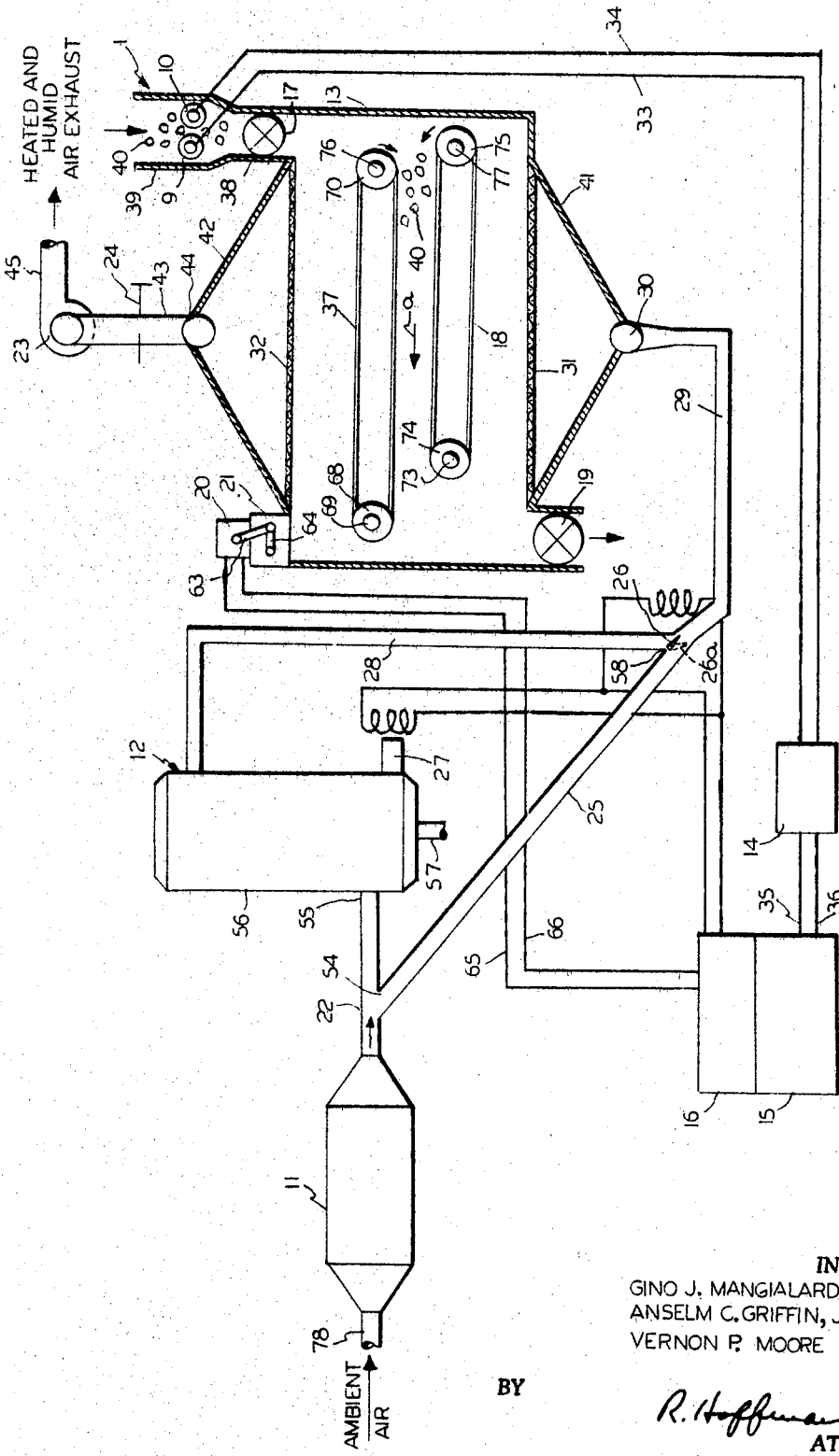
FIGURE 2 is a detailed schematic diagram showing the elements of the seed cotton conditioner 3 of FIGURE 1.

An essential feature of this invention comprises the subsystem shown in FIGURE 2 which includes the conditioning chamber, together with its associated air and moisture supplying sources, moisture detecting and controlling means, and seed cotton transporting means.

In general, the conditioning chamber comprises a vertically disposed housing, a central portion of substantially uniform cross section, and end portions forming a closed top and bottom for the central portion.

Referring to FIGURE 2, it will be seem more specifically that the conditioning chamber comprises a vertically disposed housing having a central portion 13 of substantially uniform cross section and bottom and top portions 41 and 42, respectively, progressively decreasing in transverse cross section in axially opposite directions to form, with the central portion, an enclosed chamber. A conditioning air inlet 30 is provided in bottom portion 41, and a spent air outlet is provided in top portion 42. Inside centrol portion 13, there are mounted a pair of parallel, vertically stacked, horizontally disposed, and linearly offset foraminous endless conveyor belts 18 and 37 which extend substantially across the entire width of central portion 13. The latter is provided with an inlet hopper 38, connected to the outlet end 39 of master feed controller 1, for supplying seed cotton to the conditioning chamber. Located in outlet 39 is any one of a number of known sensing devices, capable of measuring an electrical property which varies with the moisture content of a substance, and which transmits an electrical signal whose magnitude is proportional to the amount of moisture. As shown in FIGURE 2, the sensing device can comprise a pair of rotating electrodes 9 and 10 mounted in outlet 39 so that seed cotton 40, leaving master feed controller 1, passes between these electrodes. The latter are connected by means of conductors 33 and 34 to moisture detecting unit 14. An EMF, across electrodes 9 and 10, causes a current to flow through the seed cotton passing between the electrodes at any given moment. The resistance to the flow of current between these electrodes is in an inverse ratio to the moisture content of the seed cotton. Thus, the function of the electrodes is essentially to measure a variable resistance. Other known moisture-sensing means, based on measuring the resistance of a material, can be substituted for electrodes 9 and 10. Furthermore, other known sensing devices which measure different electrical properties, such as dielectric constant, can also be used.

After passing between sensing electrodes 9 and 10, the seed cotton enters central portion 13 of the conditioning chamber through dropper seal 17, and drops upon horizontal wire belt 18 which moves in the direction indicated by arrow *a*. A parallel wire belt 37 is located just above belt 18. The upper surface of belt 18 and the lower surface of belt 37 travel in the same direction, and, between them, transport the seed cotton in the form of a batt across the width of the conditioning chamber. As the cotton travels, it is subjected to a conditioning stream of air entering the chamber through air inlet 30. The air is uniformly diffused by means of lower foraminous baffle 31 which separates bottom section 41 from central portion 13 of the conditioning chamber in which belts 18 and 37 are located. This foraminous baffle can be a wire or expanded metal screen, or any other equivalent suitable structure.

The conditioning air passes upwardly through wire belt 18, then through the seed cotton on the belt, through wire belt 37, through upper foraminous baffle 32, and is collected in the top portion 42 of the conditioning chamber. Suction fan 23, by means of which air moves through the system, draws the spent air from top portion 42 into duct 43 through air outlet 44, and blows it through duct 45 to any suitable exhaust means (not shown). The volume of air flowing through the system is regulated by means of valve 24. After being conditioned, as just described, the seed cotton is discharged from the apparatus through dropper seal 19.

The just-described uniform horizontal distribution of air results in a zero temperature gradient which causes the seed cotton to be uniformly conditioned to the desired moisture content.

Referring once more to FIGURE 2, it is seen that the current flowing in line 33–34 (which is a function of the resistance, and, therefore, of the moisture content, of the incoming seed cotton 40 passing between the electrodes) is conducted to moisture detector 14 which converts the resistance measurement to a 0–10 millivolt (mv.) output in a known manner. The lower the moisture content of the cotton, the lower will be the mv. response. The signal from moisture detector 14 is then delivered through conductors 35 and 36 to recorder-controller 15–16. Recorder 15 can be a conventional strip-chart recorder (details not shown) which has been calibrated to indicate cotton fiber moisture content directly.

The information transmitted by moisture detector 14 is utilized in the following manner:

As already indicated, the only air moving in the system is that which is drawn in by means of fan 23 through inlet duct 78, the sole means of entry. Ambient air, drawn into burner 11, leaves the latter as heated dry air through duct 22. Duct 22 is provided with a Y-connection 54, one leg 55 being connected to humidifier 12 and the other leg 25 serving to by-pass the humidifier when it is desired to remove excess moisture from the seed cotton. Humidifier 12 comprises a housing 56 to which is connected a water inlet pipe 57. Inside the housing, pipe 57 terminates in a series of spray nozzles (not shown). Flow of water is controlled by schematically illustrated solenoid valve 27. When the moisture content of incoming seed cotton is too high, valve 27 is automatically closed, and solenoid-controlled valve 26 placed inside Y-connection 58, automatically shifts to the drying position shown in FIGURE 2. In this manner, moist air leaving the humidifier through duct 28 is blocked and dry, heated air from duct 25 passes to duct 29, then through air-inlet 30 at the bottom of conditioning chamber 13, as already described. However, if seed cotton 40 is too dry, solenoid-controlled valve 26 automatically shifts to the position 26a as shown by dotted lines, valve 27 opens to permit water to be sprayed inside humidifier 12, and the moisture-laden air enters duct 29 from duct 28. Duration of either drying or moisture addition is further controlled by means of motorized speed regulator 20–21 (described in detail below) which serves as the driving means for wire belts 18 and 37.

Controller 16 can be one of several devices, known to those skilled in the art, which can be programmed to operate one or more of a number of switches, selected on the basis of the incoming signal from moisture detector 14. In one such means, shown in FIGURE 5, a number of cams 46, 47, and 48 are mounted on shaft 49 of balancing motor 50 inside recorder 15. Associated with these cams are switches 51, 52, and 53, respectively, which are connected to any suitable source of power (not shown) and to motorized speed regulator 20–21, solenoid-controlled directional valve 26, and solenoid-controlled water valve 27.

The number of cams and switches to be provided is selected according to the number and nature of the operations to be controlled. Thus it was found that, with an output of 0–10 mv. by the detector 14, the following system operation gave satisfactory results:

| Moisture detector millivolt output | Controller demand |
|---|---|
| Moisture restoration for 20 secs. | 0–1.4 |
| Moisture restoration for 10 secs. | 1.5–3.4 |
| Moisture restoration for 2 secs. | [1] 3.5–4.9 |
| Drying for 2 secs. | 5.0–7.4 |
| Drying for 10 secs. | 7.5–8.9 |
| Drying for 20 secs. | 9.0–10.0 |

[1] 4.9 mv.-point of changing from moisture restoration to drying. This consists of the solenoid-controlled directional valve 26 changing position and the solenoid-controlled water valve 27 turning the spray nozzles on or off.

Duration of treatment is controlled by regulating the speed of belts 18 and 37. The means for achieving this is shown in FIGURES 3 and 4.

Figure 3:
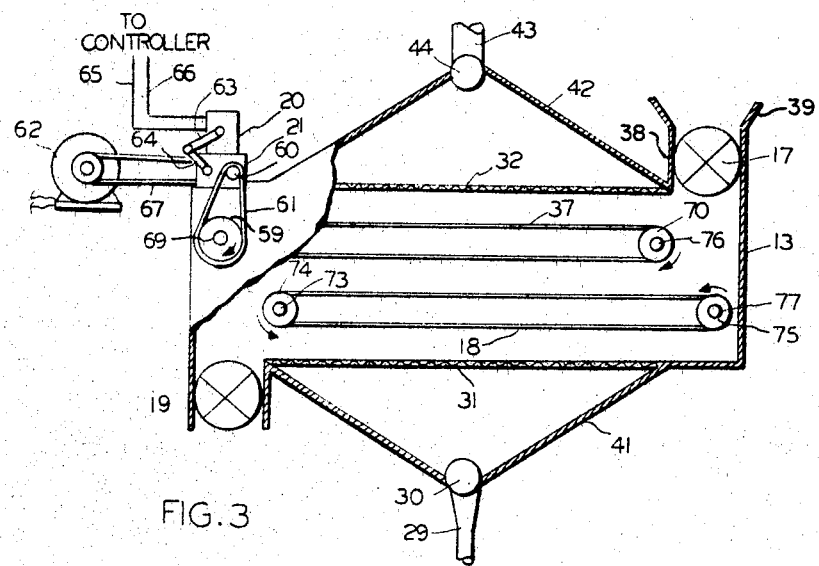
FIGURE 3 is a semi-schematic front elevation of the conditioning chamber, partly in section, showing the internal disposition of the seed cotton transporting means and the speed control means.

Referring to FIGURE 3, it is seen that belt 37 is driven by means of roller 68 (FIGURE 2) mounted on shaft 69, extending through the front and rear walls of conditioning chamber 13. Mounted on the external extension of shaft 69 at the front of the chamber is a drive pulley 59 which is connected through belt 61 to output pulley 60 of variable speed drive 21. The other end of belt 37 is mounted on idler roller 70. Variable speed drive 21 is connected at its input end 88 (FIGURE 4) to a constant speed motor 62 through belt 67. Control of belt speed is achieved by regulator 20 connected to variable speed drive 21 through linkages 63 and 64. Regulator 20 is connected to controller 16, as previously described, which transmits a command over wires 65 and 66 for selection of the appropriate speed.

Figure 4:
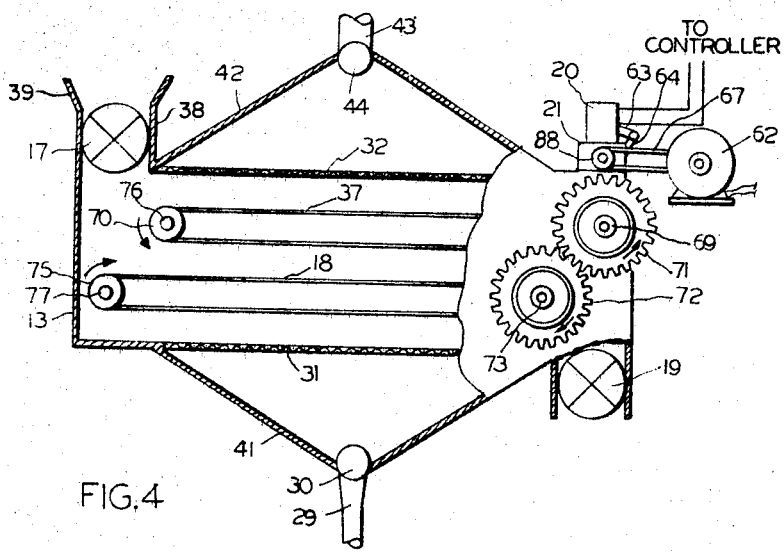
FIGURE 4 is a semi-schematic rear elevation of the conditioning chamber, partly in section, showing the driving means for the seed cotton transport.

Belt 18 is positively driven, as shown in FIGURE 4. Thus, as shown in FIGURE 4, the rear external extension of shaft 69 is provided with a gear 71 which meshes with gear 72 mounted on shaft 73, the latter extending into chamber 13 and having mounted thereon a roller 74 for supporting one end of wire belt 18. The other end of belt 18 is supported by idler roller 75. Idlers 70 and 75 are mounted on shafts 76 and 77, respectively. Shafts 69, 73, 76, and 77 are all mounted for rotation on suitable bearings (not shown) in a manner familiar to those skilled in the art. As will be apparent, meshed gears 71 and 72 rotate in opposite direction, causing the opposed faces of wire belts 18 and 37 to move in the same direction.

Tests have shown that a range of cotton batt thicknesses can be used in the conditioning chamber; but a 3-inch thickness is operationally desirable. In obtaining uniform passage of air around and through seed cotton locks for good removal and addition of moisture, it has been found satisfactory to feed seed cotton onto the wire belt to give about 1.6 pounds per cubic foot at the 3-inch depth and to supply air at a velocity of about 39 feet per minute through the batt.

Increases or decreases in seed cotton capacity can be obtained by increasing or decreasing the conditioning chamber's width or employing chambers in parallel.

While the primary objective of this invention is the maximum preservation of inherent fiber properties consistent with smooth gin operation and satisfactory final lint grades, additional advantages of this cotton ginning system employing automatic seed cotton conditioning are (a) low air volume requirements since air is not the means for transporting seed cotton through the conditioning medium, thus resulting in a saving in power consumption; (b) easier calibration of conditioning system because seed cotton is exposed to the same temperature and relative humidity air from inlet to exhaust; and (c) a removal of the static electricity problem during lint cleaning with fiber now at a higher moisture level.

We claim:

1. In a system for separating cotton fibers from seed in seed cotton wherein said system comprises, in series, feed controller means for controlling the rate of passage of seed cotton through said system, means for cleaning said seed cotton, means for feeding cleaned seed cotton to a cotton gin, means for cleaning lint leaving said cotton gin, and means for baling said cleaned lint, the improvement which comprises seed cotton conditioning apparatus interposed between said feed controller means and said seed cotton cleaning means, seed cotton conditioning apparatus being responsive to the moisture content of seed cotton in said feed controller means, whereby the moisture content of seed cotton fed to said seed cotton cleaning means is adjusted to preserve the essential fiber characteristics of the cotton, said seed cotton conditioning apparatus comprising a conditioning chamber; moisture sensing means connected to said conditioning chamber responsive to an electrical characteristic of seed cotton which varies with the moisture content of said seed cotton; and means, responsive to said moisture sensing means, connected thereto and in operative relation with the conditioning chamber for varying the moisture content of seed cotton in said conditioning chamber, said conditioning chamber comprising:

(a) a vertically disposed housing having a central portion of substantially uniform cross section and end portions forming a closed top and bottom for said central portion;
(b) conditioning air inlet means and air outlet means connected, respectively, to the bottom and top portions of said central portion;
(c) a plurality of parallel, horizontally disposed, foraminous, endless conveyor belts within said central portion extending substantially across the entire width thereof;
(d) variable speed means for driving said conveyor belts;
(e) inlet means in said housing disposed to permit unconditioned seed cotton to drop onto one end of said conveyor belts;
(f) outlet means in said housing disposed to receive conditioned seed cotton from the other end of said conveyor belts; and
(g) foraminous means between the bottom and central portions of the housing for uniformly distributing incoming conditioning air across substantially the entire transverse cross section of said central portion.

2. The system of claim 1 wherein the conditioning chamber comprises:

(a) a vertically disposed housing having a central portion of substantially uniform transverse cross section;
(b) top and bottom portions on said housing progressively decreasing in transverse cross section in axially opposite directions and forming an enclosed chamber with said central portion;
(c) conditioning air inlet means in said bottom portion and spent air outlet means in said top portion;
(d) a pair of parallel, vertically stacked, horizontally disposed, linearly offset, foraminous endless conveyor belts mounted within said central portion extending substantially across the entire width thereof;
(e) variable speed means for simultaneously driving both of said conveyor belts in opposite directions;
(f) inlet means in said housing disposed to drop unconditioned seed cotton onto one end of the lower of said conveyor belts;
(g) outlet means in said housing disposed to receive conditioned seed cotton from the other end of said lower conveyor belt; and
(h) transverse foraminous means between the bottom and central portions of the housing for uniformly distributing incoming conditioning air across substantially the entire transverse cross section of said central portion.

3. The system of claim 1 wherein the seed cotton conditioning apparatus comprises:

(a) a conditioning chamber having seed cotton inlet and outlet means, transport means within the conditioning chamber for moving seed cotton through said chamber, variable speed driving means connected to said transport means, and air inlet and outlet means for respectively conducting conditioning air to and removing spent air from said chamber;
(b) moisture sensing means adjacent the seed cotton inlet means responsive to an electrical characteristic of the seed cotton which varies with the moisture content of the seed cotton entering the inlet means of said conditioning chamber and for generating a signal indicative of the moisture content;
(c) air heating means provided with means for introducing ambient air into said heating means and with first air conducting means for removing heated air from said air heating means;
(d) humidifying means connected to said first air conducting means and provided with valved means for introducing water into air from said air heating means;
(e) second air conducting means connected to and extending between said humidifying means and the air inlet means of the conditioning chamber;
(f) third air conducting means connected to and extending between intermediate points on said first and second air conducting means, said third air conducting means constituting a by-pass to conduct unhumidified heated air directly to the conditioning chamber;
(g) air directing means within the junction of said second and third air conducting means for selectively directing humidified or unhumidified air to the conditioning chamber;
(h) moisture detecting means connected to the moisture sensing means capable of generating a variable electrical signal in accordance with the signal received from said sensing means;
(i) control means, responsive to said variable electrical signal, operatively connected to said moisture detecting means and to said variable speed driving means, valved water introducing means, and air directing means, whereby, in accordance with the moisture content of seed cotton entering the conditioning chamber, moisture is removed from or restored to said seed cotton to bring the moisture content to a predetermined level; and
(j) means connected to the air outlet means of the conditioning chamber to draw air through the air heating means, air humidifying means, and conditioning chamber.

References Cited

UNITED STATES PATENTS

| | | | |
|---|---|---|---|
| Re. 25,460 | 10/1963 | Vandergriff | 19—.27 XR |
| 3,114,175 | 12/1963 | Bryant | 19—66 |
| 3,114,613 | 12/1963 | Neitzel et al. | 34—48 |
| 3,233,335 | 2/1966 | Neitzel et al. | 34—48 |
| 3,280,474 | 10/1966 | Van Doorn et al. | 19—66 XR |

MERVIN STEIN, *Primary Examiner.*

DORSEY NEWTON, *Examiner.*